(12) United States Patent
Banales Cano et al.

(10) Patent No.: US 11,376,993 B2
(45) Date of Patent: Jul. 5, 2022

(54) ELECTRONICALLY CONTROLLED SEAT SYSTEM WITH TILT-AND-SLIDE MODE

(71) Applicant: Tesla, Inc., Palo Alto, CA (US)

(72) Inventors: David Eduardo Banales Cano, San Jose, CA (US); Nathan Di Giusto, San Ramon, CA (US)

(73) Assignee: Tesla, Inc., Austin, TX (US)

( * ) Notice: Subject to any disclaimer, the term of this patent is extended or adjusted under 35 U.S.C. 154(b) by 0 days.

(21) Appl. No.: 16/012,540

(22) Filed: Jun. 19, 2018

(65) Prior Publication Data

US 2019/0381913 A1 Dec. 19, 2019

(51) Int. Cl.
*B60N 2/12* (2006.01)
*B60N 2/02* (2006.01)
*B60N 2/90* (2018.01)
B60N 2/08 (2006.01)

(52) U.S. Cl.
CPC ............ *B60N 2/0232* (2013.01); *B60N 2/12* (2013.01); *B60N 2/919* (2018.02); *B60N 2/0881* (2013.01); *B60N 2002/024* (2013.01); *B60N 2002/0236* (2013.01); *B60N 2205/40* (2013.01)

(58) Field of Classification Search
CPC ... B60N 2/14; B60N 2/20; B60N 2/12; B60N 2/22; B60N 2/18; B60N 2/919
USPC .............................................. 297/341, 344.1
See application file for complete search history.

(56) References Cited

U.S. PATENT DOCUMENTS

| | | | | |
|---|---|---|---|---|
| 6,799,801 B2* | 10/2004 | Niimi | .................... | B60N 2/206 297/366 |
| 6,857,702 B2* | 2/2005 | Becker | ................. | B60N 2/0705 297/341 |
| 7,017,993 B2* | 3/2006 | Niimi | .................. | B60N 2/0705 297/341 |
| 8,376,459 B2* | 2/2013 | Kumazaki | ................ | B60N 2/12 297/341 |
| 8,967,719 B2* | 3/2015 | Ngiau | .................... | B60N 2/123 297/341 |
| 8,998,331 B2* | 4/2015 | Hage-Hassan | ....... | B60N 2/3013 297/378.1 |
| 9,114,732 B2* | 8/2015 | Cooley | .................... | B60N 2/06 |
| 9,688,164 B2 | 6/2017 | Vikstrom et al. | | |
| 9,731,630 B2* | 8/2017 | Sasaki | ...................... | B60N 2/12 |
| 9,914,431 B2* | 3/2018 | Tsunoda | ................. | B60R 25/014 |
| 10,029,587 B2* | 7/2018 | Hattori | ................ | B60N 2/0837 |
| 10,065,532 B2* | 9/2018 | Ioppolo | ............... | B60N 2/0893 |
| 10,232,745 B2* | 3/2019 | Ferre | .................... | B60N 2/2213 |
| 10,252,644 B2* | 4/2019 | Aktas | ....................... | B60N 2/20 |
| 10,286,814 B2* | 5/2019 | Ploch | ....................... | B60N 2/07 |

(Continued)

*Primary Examiner* — Syed A Islam
(74) *Attorney, Agent, or Firm* — Knobbe, Martens, Olson & Bear, LLP

(57) ABSTRACT

A seat system includes: a base; a seatback; at least one recliner connecting the base and the seatback to each other for pivoting of the seatback relative to the base; a slider coupled to the base and configured for sliding engagement with a track having a detent region and a tilt-and slide region; and an electronic controller, wherein without mechanical interlock between the recliner and the slider, the electronic controller causes the recliner to place the seatback in a non-passenger position when the slider is within the tilt-and-slide region, and causes the recliner to place the seatback in a passenger position when the slider is within the detent region.

22 Claims, 11 Drawing Sheets

(56) References Cited

U.S. PATENT DOCUMENTS

| | | | |
|---|---|---|---|
| 2008/0067851 A1* | 3/2008 | Tomandl | B60N 2/0224 297/362.12 |
| 2010/0026070 A1* | 2/2010 | Rohee | B60N 2/0248 297/344.1 |
| 2011/0133529 A1* | 6/2011 | Guerrero | B60N 2/4221 297/216.18 |
| 2013/0200673 A1* | 8/2013 | Rdzanek | B60N 2/02 297/313 |
| 2013/0285428 A1* | 10/2013 | Livesey | B60N 2/06 297/317 |
| 2014/0015297 A1* | 1/2014 | Cooley | B60N 2/20 297/378.1 |
| 2014/0217794 A1* | 8/2014 | Emrich | B60N 2/20 297/337 |
| 2015/0202996 A1* | 7/2015 | Kajale | B60N 2/206 297/363 |
| 2016/0090012 A1 | 3/2016 | Aktas | |
| 2016/0159256 A1 | 6/2016 | Szlag | |
| 2017/0291507 A1* | 10/2017 | Hattori | B60N 2/0818 |
| 2018/0037140 A1* | 2/2018 | Gollhardt | B60N 2/0232 |
| 2018/0141470 A1* | 5/2018 | Lee | B60N 2/20 |
| 2019/0092191 A1* | 3/2019 | Bouzid | B60N 2/164 |

* cited by examiner

ELECTRONICALLY CONTROLLED SEAT SYSTEM WITH TILT-AND-SLIDE MODE

BACKGROUND

Seats that have one or more moveable components are sometimes referred to as kinematic seats, and may have a seatback that can be pivoted into different positions. Kinematic seats have been used in vehicles, for example as a first-row seat and/or as a second-row seat. The kinematics can allow the seat to temporarily be moved out of the way, for example to simplify ingress into or egress out of the vehicle. This can involve tilting of the seatback as well as sliding of the entire seat along a track on the vehicle floor.

SUMMARY

In a first aspect, a seat system includes: a base; a seatback; at least one recliner connecting the base and the seatback to each other for pivoting of the seatback relative to the base; a slider coupled to the base and configured for sliding engagement with a track having a detent region and a tilt-and-slide region; and an electronic controller, wherein without mechanical interlock between the recliner and the slider, the electronic controller causes the recliner to place the seatback in a non-passenger position when the slider is within the tilt-and-slide region, and causes the recliner to place the seatback in a passenger position when the slider is within the detent region.

Implementations can include any or all of the following features. The seat system further includes a first mechanism actuated to allow the slider to bypass detents in the detent region, and a second mechanism actuated to allow the slider to cross a boundary between the detent region and the tilt-and-slide region. The seat system further includes an actuator for the slider, the actuator configured to pull a cable to actuate both the first and second mechanisms. Actuating a lever on the second mechanism causes a lever on the first mechanism to be actuated. The seat system further includes a manual handle coupled for actuating the first mechanism and not the second mechanism. The seat system further includes a gas spring assist coupled to the slider to assist the slider in traveling from the detent region to the tilt-and-slide region. The seat system further includes a forward stopper and a rearward stopper for the recliner. The seat system further includes a lever on the recliner, and an actuator, the actuator actuating the forward and rearward stoppers and the lever. The actuator pulls a cable of the lever while paying out the cable to the forward and rearward stoppers. The seat system includes first and second recliners, wherein the forward stopper acts on the first recliner, and wherein the rearward stopper acts on the second recliner. The seat system further includes a switch that the electronic controller uses in determining that the slider crosses a boundary between the detent region and the tilt-and-slide region. The seat system further includes a recliner spring coupled to the recliner, wherein placing the seatback in the non-passenger position comprises unlocking the recliner and allowing the recliner spring to pivot the seatback into the non-passenger position. The seat system further includes a recliner switch, wherein the electronic controller uses the recliner switch to determine that the seatback is in the passenger position. The seat system further includes a button coupled to the electronic controller, the button to trigger the electronic controller to bring the seat system from a comfort mode where the slider is within the detent region and the seatback is in the passenger position, to a tilt-and-slide mode where the slider is within the tilt-and-slide region and the seatback is within the non-passenger position.

In a second aspect, a method includes: moving a slider of a seat system from a detent region of a track to a tilt-and-slide region of the track; adjusting a seatback to a non-passenger position while the slider is in the tilt-and-slide region, the seatback adjusted using a recliner that has no mechanical interlock with the slider; determining that the slider has moved from the tilt-and-slide region to the detent region; and in response, placing the seatback in a passenger position using the recliner.

Implementations can include any or all of the following features. Moving the slider comprises actuating a first mechanism to allow the slider to bypass detents in the detent region, and actuating a second mechanism to allow the slider to cross a boundary between the detent region and the tilt-and-slide region. Actuating the first and second mechanisms comprises pulling a cable. Actuating a lever on the second mechanism causes a lever on the first mechanism to be actuated. The method further includes applying gas spring assist in moving the slider from the detent region to the tilt-and-slide region. Adjusting the seatback to the non-passenger position comprises releasing the recliner and applying forward and rearward stoppers to the recliner. Releasing the recliner comprises pulling a cable of the recliner, and wherein applying the forward and rearward stoppers to the recliner comprises feeding out the cable to the forward and rearward stoppers. Adjusting the seatback to the non-passenger position while the slider is in the tilt-and-slide region comprises placing the seat system in a tilt-and-slide mode in response to a first input, and wherein placing the seatback in the passenger position in response to the slider having moved from the tilt-and-slide region to the detent region comprises placing the seat system in a comfort mode, the method further comprising receiving a second input to place the seat system in a fold flat mode, and in response to the second input, releasing the recliner without applying any stopper to the recliner, and allowing a recliner spring to pivot the seatback into a fold flat position.

DETAILED DESCRIPTION

Figure 1:
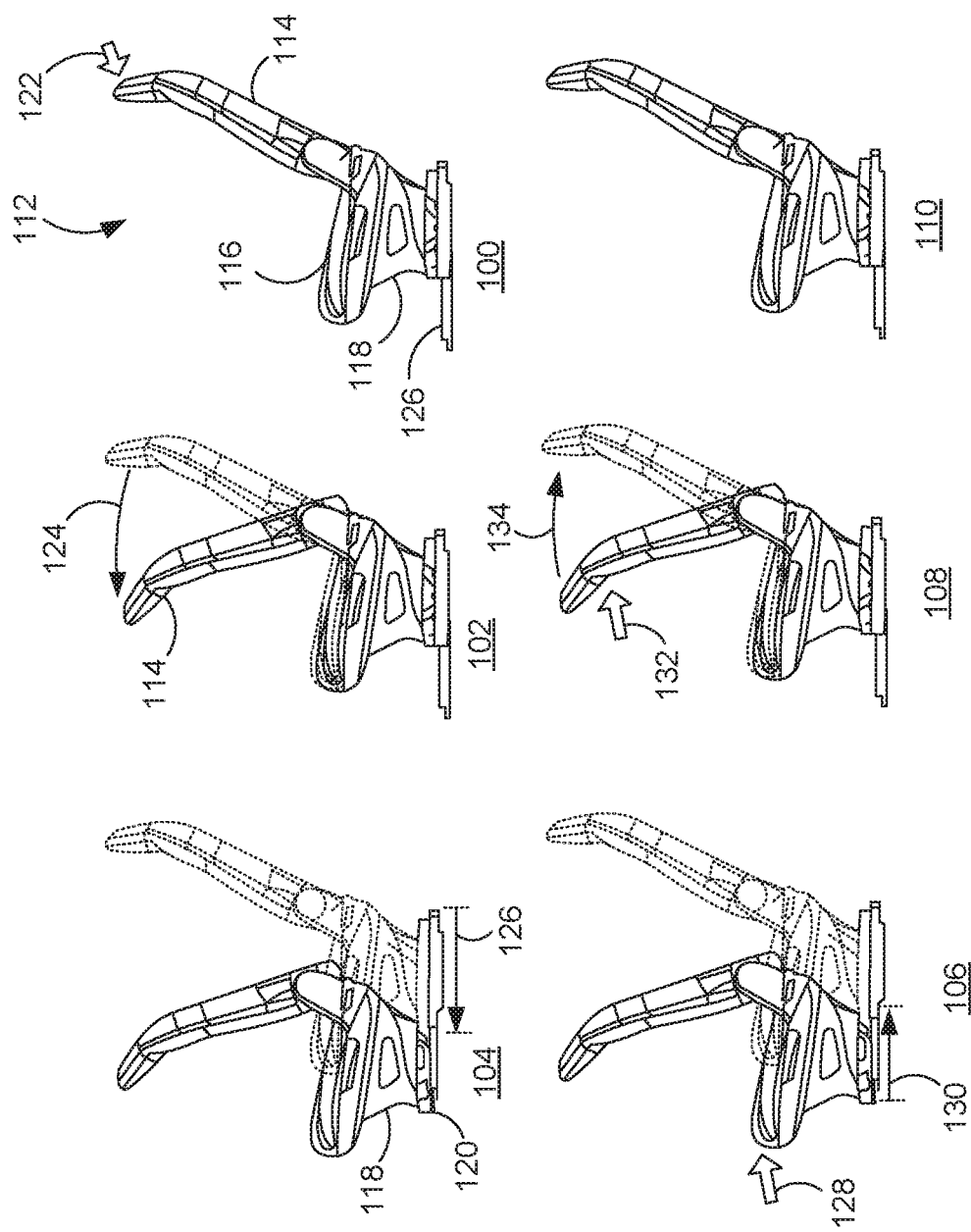
FIG. 1 shows examples of states illustrating a tilt-and-slide mode of a seat system.

This document describes examples relating to providing advantageous control of the tilting and sliding of a seat to facilitate comfortable seating and avoiding potentially unwanted scenarios. When a kinematic seat is mounted on a track (such as on the floor of a vehicle), a slider can be configured to allow the seat to slide along the track in what is sometimes called an "easy entry" operation mode, where the seat slides (e.g., forward) and the seatback is tilted to make room for a person to pass by the seat. An easy-entry operation is sometimes referred to as a tilt-and-slide operation because it involves the seatback tilting while the seat is free to slide along the tracks.

However, a sliding seat may not be able to absorb seatbelt loads from a passenger in case of a collision, and a person should not be able to sit in the seat while it is in the easy entry operation mode. Some implementations will therefore place the seatback in what can be referred to as a non-passenger position while the seat is able to slide freely. Upon the slider again becoming secured so that the seat is no longer free to slide, the system can allow the seatback to be returned to a passenger position. Architectures that facilitate such functionality can simplify the construction, operation, and maintenance of the seat system, and can provide the opportunity to implement other kinematic behaviors.

Earlier approaches for providing easy-entry to a vehicle include mechanical approaches and electromechanical approaches. A mechanical approach can have a mechanical handle on top of the seatback that is connected, by cables in the seat interior, to a recliner system and to a slider that secures the seat on the track. When the user pulls the handle, the same mechanical motion is translated through the individual cables to open the mechanism that allows the seatback to be tilted and to open the mechanism that secures the slider to the track. Mechanical systems can be associated with the disadvantage that they require the user to apply the mechanical force and that remote control may not be possible, as well as that the system is not flexible in terms of defining different types of kinematics, or behaviors.

An existing electromechanical approach can substitute a power switch for the handle used in the mechanical approach. When the user presses the switch this causes an electrical signal to be sent to a motor inside the seat, which can then wind a cable and release the recliner and slider systems so that the seat assumes the desired easy-entry configuration. Electromechanical systems can be associated with the disadvantage that they are slow to activate because of the way a common motor actuates the individual systems. In order to prevent a person from entering the seat while it is not secured to the track, mechanical interlocks (e.g., linkages) between the slider and the position of the recliner have been used. However, such approaches can be difficult to implement and maintain, and can prevent flexibility with different types of kinematics.

FIG. 1 shows examples of states 100-110 illustrating a tilt-and-slide mode of a seat system 112. In some implementations, the seat system 112 can be implemented inside a vehicle. The seat system 112 can be configured to accommodate one or more persons. For example, the seat system 112 can be a one-person seat (e.g., the "40" of a so-called 60/40 split seat), or a two-person seat (e.g., the "60" of a 60/40 split seat). The seat system 112 can be implemented as a first-row, second-row, and/or higher-row seat in a vehicle. An implementation can allow the tilt-and-slide mode to provide easy entry into another area of the vehicle (e.g., to a subsequent row of seats). The seat system 112 here includes a seatback 114, a seat cushion 116, and a base 118 to which the seatback 114 is hinged. The seat system 112 here sits atop at least one track 120. For example, the track 120 can be mounted on the floor inside the vehicle.

The state 100 can be considered a "comfort" state in that the seat system 112 is ready for use by a passenger (not shown). In the state 100, the base 118 is normally secured to the track 120 so that the seat system 112 does not slide, but the seat system 112 can allow the user to selectively move the seat system 112 forward or backward on the track 120 to find the most comfortable position. The track 120 can have detents (not shown) with which the base 118 (e.g., one or more sliders attached to the base 118) can engage, and this portion of the track 120 can then be considered a detent region. The seatback 114, moreover, can be inclined to the passenger's liking using one or more recliners that hinge the seatback 114 and the base 118 to each other.

In the state 100, a user can initiate a tilt-and-slide mode by way of an input 122. For example, the user presses a button of a power switch mounted on the seatback 114. In response to the input 122, the seat system 112 can undergo a tilt as indicated in state 102, and a slide as indicated in state 104. In some implementations, the seat system 112 transitions essentially simultaneously into the states 102 and 104. For example, an electric controller (not shown) of the seat system 112 can initiate the tilting essentially at the same time as the slide, and the states 102 and 104 can then be entered into depending on the time it takes for individual components to execute the respective functions.

The state 102 indicates that the seatback 114 has been tilted through an angle 124 compared to the state 100. The original orientation of the seatback 114 is shown in phantom for clarity. Rotation through the angle 124 here corresponds to the seatback 114 being in a non-passenger position. In some implementations, the angle 124 is large enough that it is impracticable (or impossible) for a passenger to enter the seat system 112 in the current state. For example, the angle 124 can be on the order of about 40-50 degrees. The seatback 114 can be locked in the non-passenger position to prevent a person from entering the seat system.

The state 104 indicates that the base 118 has slid along the track 120 for a distance 126. The sliding can take place in a portion of the track 120 that does not have detents. Because the region facilitates sliding as part of the tilt-and-slide mode, such a region can be referred to as a tilt-and slide region of the track 120. As such, the distance 126 over which the base 118 slides in entering the state 104 can be at least the entire tilt-and-slide region of the track 120. For example, at the beginning of the sliding motion, the base 118 can also be traveling past one or more detents than can be in the detent region of the track 120. The seat system 112 can now be considered as being in an easy entry mode because the tilting of the seatback 114 and the sliding of the base 118 along the track 120 has freed up space next to the seat system 112 (as indicated in the state 104) for a passenger entering or leaving another space in the vehicle (e.g., another row of seats).

The seat system 112 can remain in the easy entry mode for an indeterminate time, during which the seatback 114 is locked in the non-passenger position. If a user wishes to bring the seat system 112 to its original position, this can be done by way of an action 128 as indicated in the state 106. In some implementations, the user can push on the seat system 112 in the opposite direction of the sliding. For example, the user can push on the seat cushion 116, the seatback 114 and/or another part of the seat system 112. This can cause the base 118 to travel a distance 130, during which the seatback 114 remains locked in the non-passenger position. In some implementations, the distance 130 can cover the distance until the tilt-and-slide region meets the detent region of the track 120. For example, the seat system 112 can be configured so that it stops and becomes secured at the first detent of the detent region, thereby securing the seat system 112 against further sliding.

When the seat system 112 again becomes secured against sliding, the seat system 112 can allow the seatback 114 to be brought out of the non-passenger position. The state 108 indicates that the seat system 112 has unlocked the seatback 114 from the non-passenger position. The unlocking can follow closely upon (e.g., almost coincidentally with) the locking of the base 118 (e.g., the slider) onto the detent region of the track 120. That locking, and/or the unlocking of the seatback 114 itself, can produce a perceptible sound (e.g., a click) which can serve as a signal to the user that the seatback 114 can now be moved into a passenger position. A user can therefore move the seatback 114 by way of an input 132. Here, in the state 108 the user rotates the seatback 114 by an angle 134 in the opposite direction of the rotation by the angle 124 in state 102. For example, the angle 134 can be on the order of about 40-50 degrees.

The state 110 shows the seat system 112 with the seatback 114 in a passenger position. That is, the base 118 (e.g., a slider thereof) is then locked against the track 120 (e.g., by one or more detents in a detent region thereof). The seatback 114 is locked in a passenger position. A passenger can therefore enter the seat system 112. The seatback 114 can be selectively adjusted (e.g., by way of a mechanical handle actuating a recliner) to any of multiple comfort positions. As such, the state 110 can be considered equivalent or identical to the state 100.

The above example illustrates a seat system (e.g., the seat system 112) being brought from a comfort mode (e.g., in the state 100) where a slider (e.g., the slider of the base 118) is within a detent region of the track and the seatback (e.g., the seatback 114) is in a passenger position, to a tilt-and-slide mode (e.g., in the states 102 and 104) where the slider is within a tilt-and-slide region of the track and the seatback is within a non-passenger position (e.g., after tilting by the angle 124). The transition can be triggered electronically, for example by a user pressing a button coupled to an electronic controller.

Figure 2:
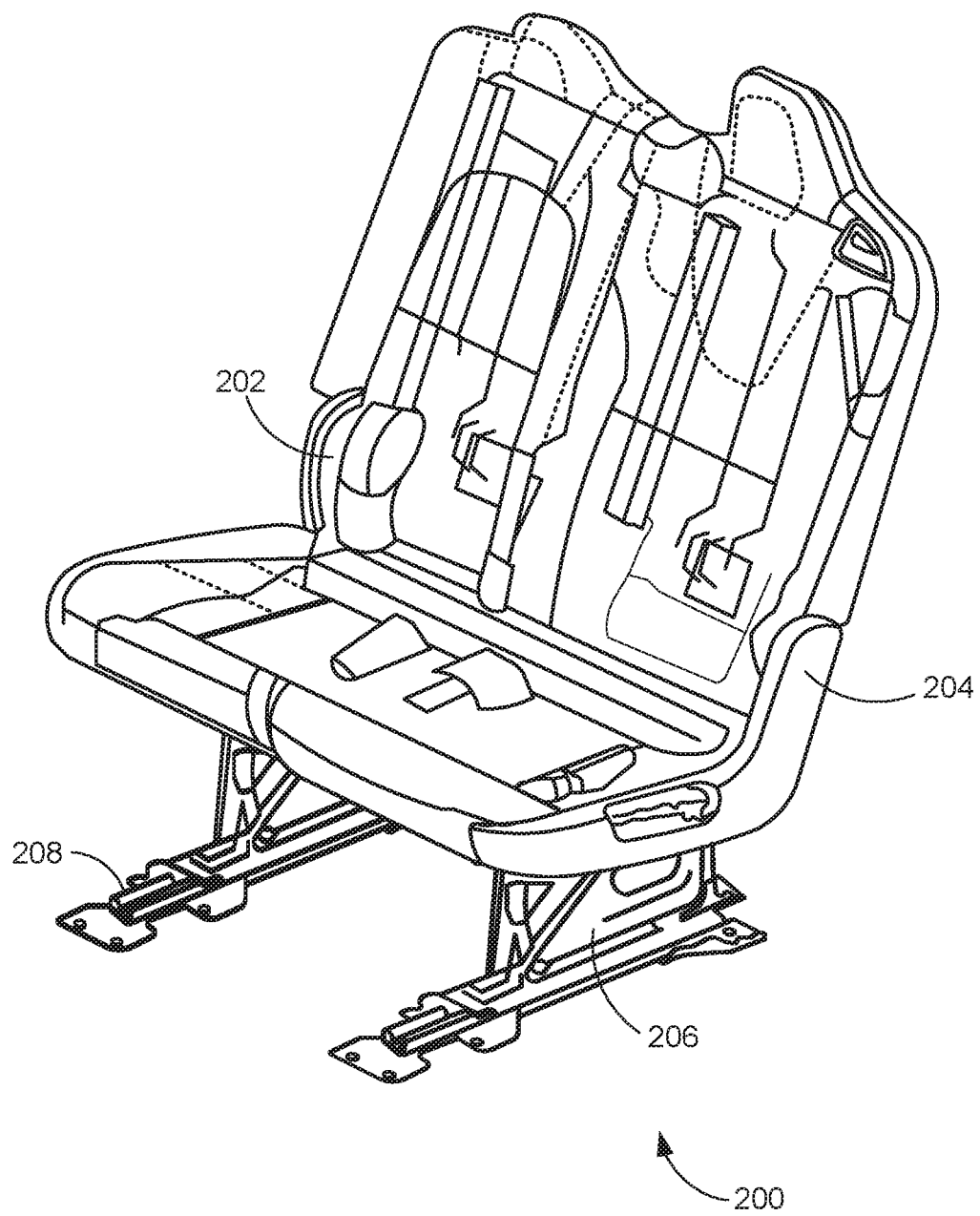
FIG. 2 shows an example of a vehicle seat.

FIG. 2 shows an example of a vehicle seat 200. Here, the vehicle seat 200 serves to hold two passengers (not shown) side by side. For example, the vehicle seat 200 can be considered the 60 section of a 60/40 split seat. The vehicle seat 200 has a recliner 202 positioned on the right side from each passenger's perspective, and a recliner 204 positioned on the left side. For example, the recliner 202 can be considered to be on the inboard side, and the recliner 204 on the outboard side, of the vehicle seat 200. The recliners 202 and 204 facilitate pivoting of a seatback relative to a base on the vehicle seat 200. The vehicle seat 200 has a base 206 that can secure the vehicle seat 200 to, or allow the vehicle seat 200 to slide against, one or more tracks 208 that can be attached to the vehicle (e.g., on a floor thereof).

Figure 3A:
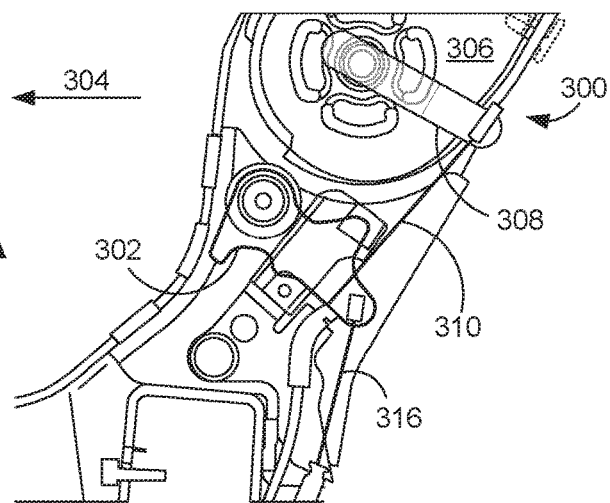
FIGS. 3A-C show examples of a recliner with a rearward stopper.
Figure 3B:
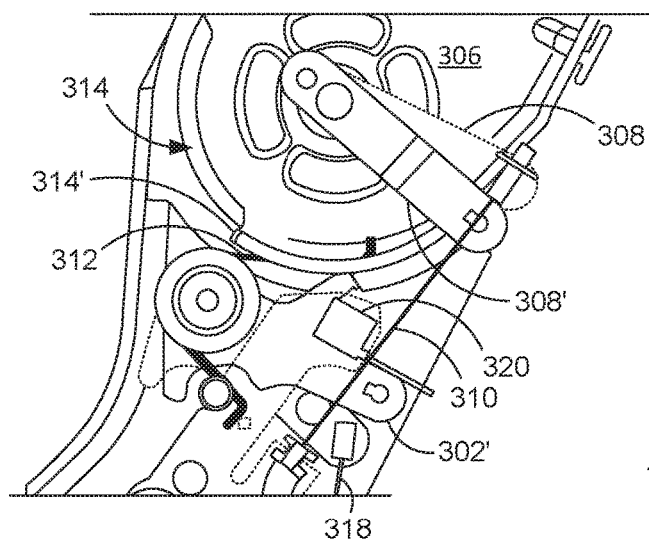
Figure 3C:
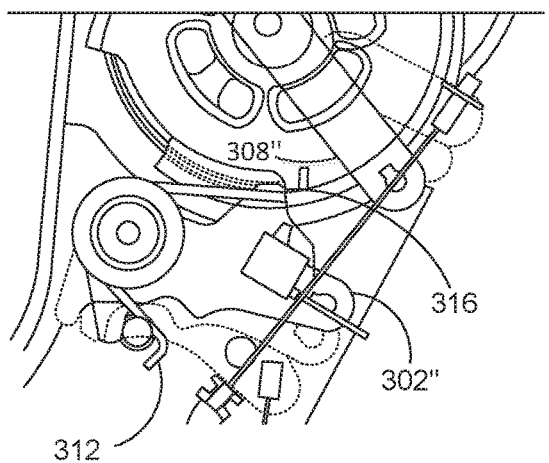

FIGS. 3A-C show examples of a recliner 300 with a rearward stopper 302. The recliner 300 can be implemented to hinge a seatback relative to a base of a seat. For example, the recliner 300 can serve as the recliner 202 in the vehicle seat 200 (FIG. 2). An arrow 304 indicates the direction a passenger would normally face when sitting in the seat having the recliner 300 (e.g., this can be the forward direction in the vehicle). The rearward stopper 302 can, when actuated, serve to restrict pivoting of the seatback in a certain direction. For example, in the vehicle seat 200 (FIG. 2) the rearward stopper 302 can be actuated to restrict the seatback from being pivoted away from the seat cushion on the base 206 (e.g., a rearward tilting).

The recliner 300 here includes a static plate and a moving plate 306 facing each other. The moving plate 306 is attached to the seatback (e.g., to the frame inside the seatback). The static plate, which is obscured by the moving plate 306 in this view, can be attached to a portion of the vehicle seat that does not rotate with the seatback (e.g., to the base 206 in FIG. 2). The relative rotation between the moving plate 306 and the static plate can take place about a center of the recliner 300.

The recliner 300 has a lever 308 that can be pivoted about the center of the moving plate 306 and the static plate. A flexible cable 310 is attached to the lever 308. In the position shown in FIG. 3A, the lever 308 locks the moving plate 306 from rotating relative to the static plate. For example, the lever 308 can be biased by a spring toward the locked position.

FIG. 3B shows that the lever 308 (shown in phantom) has been rotated clockwise in this view and is indicated as a lever 308'. In FIG. 3C, moreover, the lever is indicated by a lever 308". The rotation of the lever 308 into the position of the lever 308' and the position of the lever 308" is effectuated by pulling of the cable 310. For clarity, the cable 310 is only shown in the position it has in the original location of the lever 308.

The rearward stopper 302 is biased for rotation toward the moving plate 306 by a spring 312. The moving plate 306 has a recess 314 forming a face 314'. The rotation of the moving plate 306 and the biasing of the rearward stopper 302 can cause a face 316 of the rearward stopper 302 to enter the recess 314. The position of the rearward stopper 302 in FIG. 3B is indicated by a rearward stopper 302', and in FIG. 3C by a rearward stopper 302". When the face 316 abuts the face 314' this locks the moving plate 306, and thereby the seatback, against further rotation in that direction. A flexible cable 318 can be attached to the rearward stopper 302 to pull the rearward stopper 302 in a rotation direction opposite that of the bias from the spring 312. A paying out of the cable 318 can allow the rearward stopper 302 to assume the position of the rearward stopper 302' and the position of the rearward stopper 302". For clarity, the cable 318 is shown only in the position it has with the rearward stopper 302.

The recliner 300 can have one or more switches or other sensors. Here, a switch 320 (e.g., a micro switch) is mounted to the rearward stopper 302. In some implementations, the switch 320 can detect a certain position of the rearward stopper 302 (e.g., by the switch 320 engaging or disengaging). For example, the switch 320 can signal an electric controller (not shown) that the seatback is currently in a passenger position (e.g., in one of multiple comfort positions available by adjustment of the recliner 300).

Figure 4A:
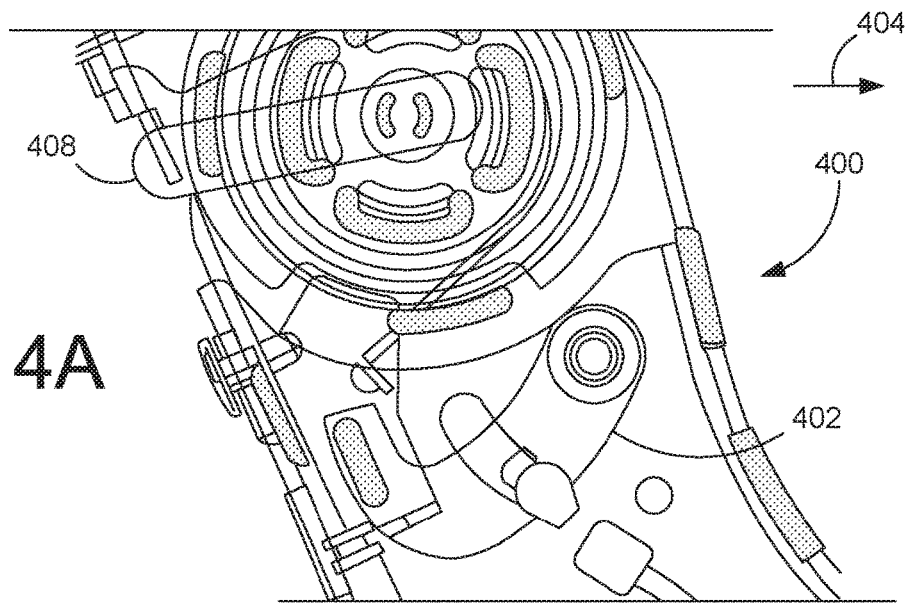
FIGS. 4A-C show examples of a recliner with a forward stopper.
Figure 4B:
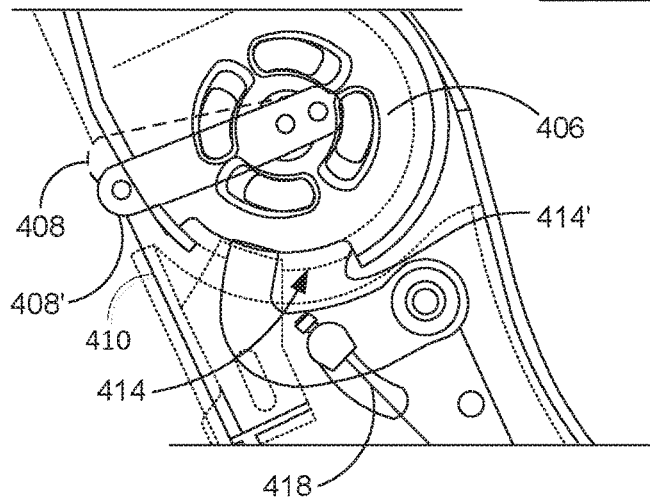
Figure 4C:
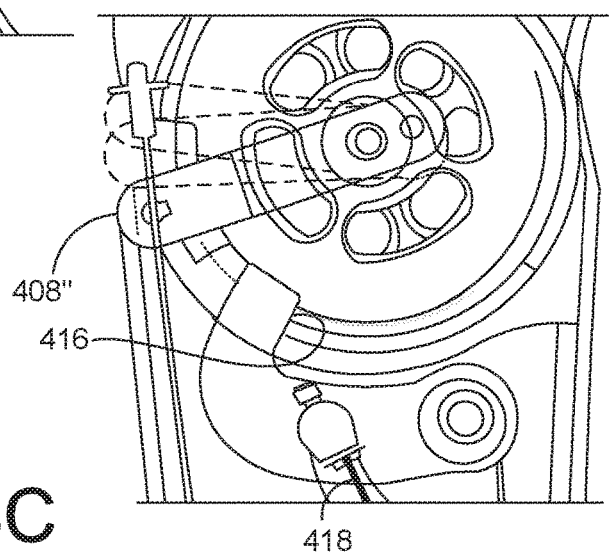

FIGS. 4A-C show examples of a recliner 400 with a forward stopper 402. The recliner 400 can be implemented to hinge a seatback relative to a base of a seat. For example, the recliner 400 can serve as the recliner 204 in the vehicle seat 200 (FIG. 2). An arrow 404 indicates the direction a passenger would normally face when sitting in the seat having the recliner 400 (e.g., this can be the forward direction in the vehicle). The forward stopper 402 can, when actuated, serve to restrict pivoting of the seatback in a certain direction. For example, in the vehicle seat 200 (FIG. 2) the forward stopper 402 can be actuated to restrict the seatback from being pivoted toward the seat cushion on the base 206 (e.g., a forward tilting).

The recliner 400 here includes a static plate and a moving plate 406 facing each other. The moving plate 406 is attached to the seatback (e.g., to the frame inside the seatback). The static plate, which is obscured by the moving plate 406 in this view, can be attached to a portion of the vehicle seat that does not rotate with the seatback (e.g., to the base 206 in FIG. 2). The relative rotation between the moving plate 406 and the static plate can take place about a center of the recliner 400.

The recliner 400 has a lever 408 that can be pivoted about the center of the moving plate 406 and the static plate. A flexible cable 410 is attached to the lever 408. In the position shown in FIG. 4A, the lever 408 locks the moving plate 406 from rotating relative to the static plate. For example, the lever 408 can be biased by a spring toward the locked position.

FIG. 4B shows that the lever 408 (shown in phantom) has been rotated clockwise in this view and is indicated as a lever 408'. In FIG. 4C, moreover, the lever is indicated by a lever 408". The rotation of the lever 408 into the position of the lever 408' and the position of the lever 408" is effectuated by pulling of the cable 410. For clarity, the cable 410 is only shown in the position it has in the original location of the lever 408.

The forward stopper 402 is biased for rotation toward the moving plate 406 by a spring (not shown). The moving plate 406 has a recess 414 forming a face 414'. The rotation of the moving plate 406 and the biasing of the forward stopper 402 can cause a face 416 of the forward stopper 402 to enter the recess 414. The position of the forward stopper 402 in FIG. 4B is indicated by a forward stopper 402', and in FIG. 4C by a forward stopper 402". When the face 416 abuts the face 414' this locks the moving plate 406, and thereby the seatback, against further rotation in that direction. A flexible cable 418 can be attached to the forward stopper 402 to pull the forward stopper 402 in a rotation direction opposite that of the bias from the spring. A paying out of the cable 418 can allow the forward stopper 402 to assume the position of the forward stopper 402' and the position of the forward stopper 402". For clarity, the cable 418 is shown only in the position it has with the forward stopper 402.

The above examples illustrate that a seat system (e.g., the vehicle seat 200) can include a forward stopper (e.g., the forward stopper 402) and a rearward stopper (e.g., the rearward stopper 302) for a recliner (e.g., the recliner 300 and/or the recliner 400). The above examples illustrate that a seat system (e.g., the vehicle seat 200) can include first and second recliners (e.g., the recliners 300 and 400), wherein the forward stopper acts on the first recliner (e.g., by the face 316), and wherein the rearward stopper acts on the second recliner (e.g., by the face 416). The above examples illustrate that a seat system (e.g., the vehicle seat 200) can include a recliner switch (e.g., the switch 320). An electronic controller can use the recliner switch to determine that the seatback is in a passenger position.

Figure 5A:
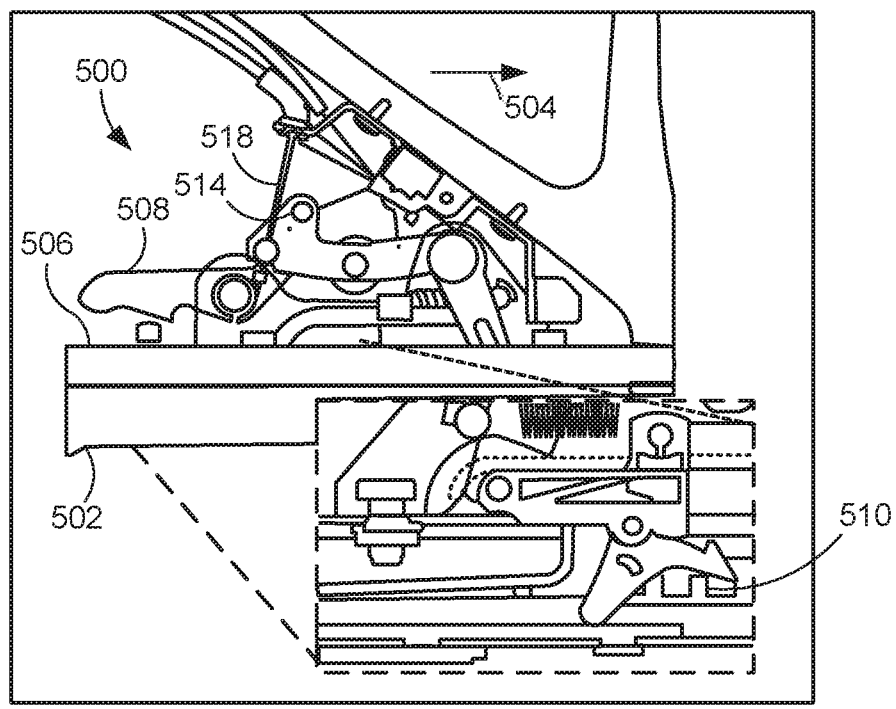
FIGS. 5A-C show examples of a slider on a track.
Figure 5B:
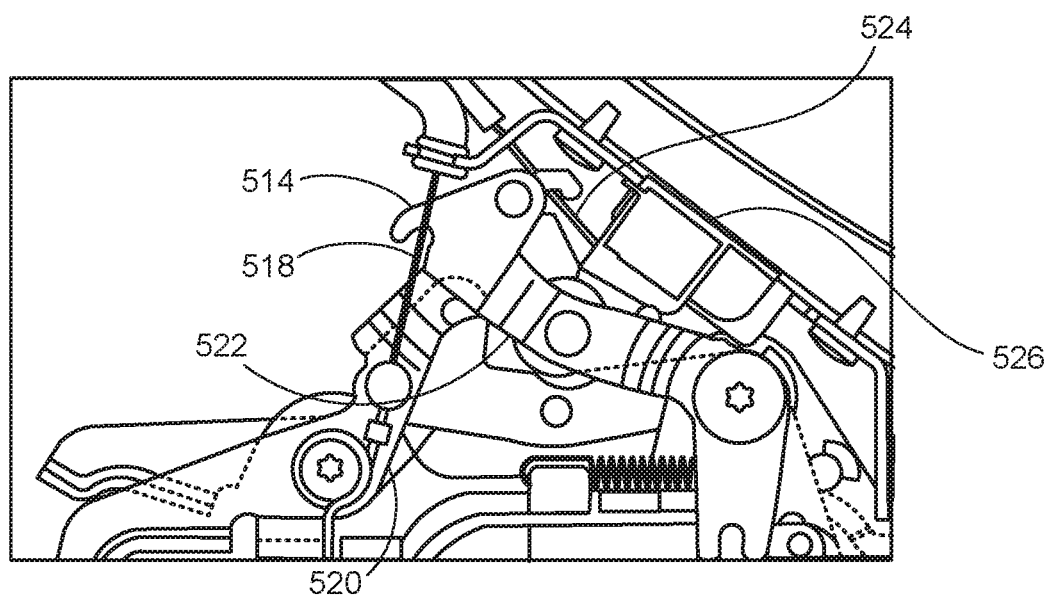
Figure 5C:
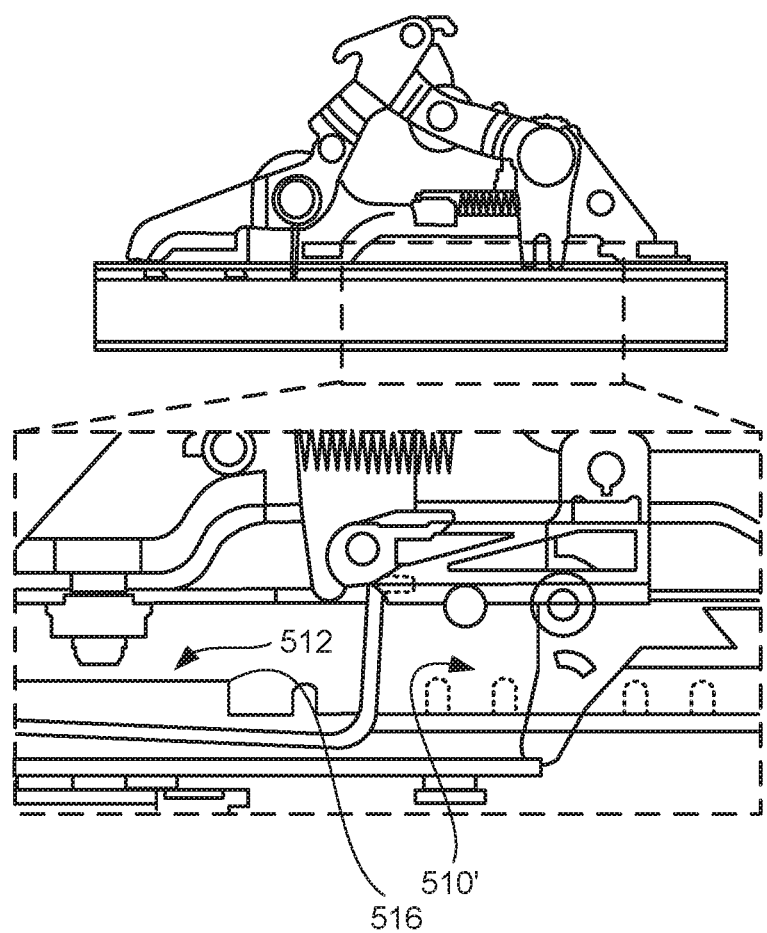

FIGS. 5A-C show examples of a slider 500 on a track 502. For example, the slider 500 can be located on the base 206 (FIG. 2) to secure or slide the vehicle seat with regard to the track 208. An arrow 504 indicates the direction a passenger would normally face when sitting in the seat having the slider 500 (e.g., this can be the forward direction in the vehicle). The track 502 can be securely mounted, such as to the floor of a vehicle. The slider 500 can have a portion 506 that abuts the track 502.

A mechanism 508 controls movability of the slider 500 with regard to detents 510 on the track 502. The detents 510 are located in a detent region 510' of the track 502. For example, the detent region 510' can be situated at the end of the track 502 where the seat should be positioned during passenger use. The track 502 can also have at least one other region without detents. Here, the track 502 has a tilt-and-slide region 512 that extends in a direction away from the detent region 510'. The mechanism 508 can engage with one or more of the detents 510 and secure the slider 500 relative to the track 502 in the detent region 510'. As such, actuation of the mechanism 508 can allow the slider 500 to move past one or more of the detents 510 and thereby to slide within the detent region 510'. In the tilt-and slide region 512, by contrast, the mechanism 508 may allow the slider to slide freely. When the slider 500 is traveling from the tilt-and-slide region 512 toward the detent region 510', the mechanism 508 may engage with the first detent 510 and thereby secure the slider 500.

A mechanism 514 can control movability of the slider 500 into the tilt-and-slide region 512. A boundary 516 can define where the tilt-and-slide region 512 ends and where the detent region 510' begins. The slider 500 may not be able to cross from the detent region 510' past the boundary 516 into the tilt-and-slide region 512 unless the mechanism 514 is actuated.

The slider 500 can have one or more cables for actuating the mechanisms 508 and/or 514. A flexible cable 518 can be configured to act on at least one of the mechanisms 508 and 514. Here, the cable 518 is attached to a lever 520 that is part of the mechanism 508. Also, the mechanisms 508 and 514 are arranged so that when the lever 520 is actuated due to the cable 518 being pulled, this also actuates a lever 522 that is part of the mechanism 514. For example, the lever 520 can have a pin that engages with the lever 522. As such, the pulling of the cable 518 can actuate both of the mechanisms 508 and 514 at once. In addition, a flexible cable 524 can be attached to the lever 522 of the mechanism 514. Here, by contrast, the mechanisms 508 and 514 are arranged so that when the lever 522 is actuated due to the cable 524 being pulled, this does not also actuate the lever 520 that is part of the mechanism 508. As such, it is possible to actuate the mechanism 514 without simultaneously actuating the mechanism 508.

The slider 500 can have a switch 526 to detect one or more conditions. In some implementations, the switch 526 can signal (e.g., by engaging or disengaging) a particular position of the slider 500. For example, the switch 526 can indicate that the slider 500 has engaged with one of the detents 510 (e.g., with the first detent 510 that the slider engages upon reaching the boundary 516).

The above examples of a reclining system (e.g., the recliners 300 (FIGS. 3A-C) and 400 (FIGS. 4A-C)), and a sliding system (e.g., the slider 500 (FIGS. 5A-C)) that operate without a mechanical interface to each other. That is, the recliners 300 and 400 can control the position of the seatback, including whether the seatback is in a passenger position or a non-passenger position, without mechanically being controlled or restricted by the slider 500 or its position. Likewise, the slider 500 can control the position of the seat along a track, including whether the slider is firmly secured to a detent or sliding freely, without mechanically being controlled or restricted by the recliners 300 and 400. Rather, particular characteristics of a kinematic behavior—such as that a seatback should be in a non-passenger position when the seat is free to slide, and that the seatback should be in a passenger position when the seat is secured—can be controlled by an electronic system, for example as described below. Such an approach can allow the system to be flexible in allowing multiple different kinematic behaviors, and/or can provide for a rapid release of the system such that an easy entry mode can be activated quickly.

Figure 6:
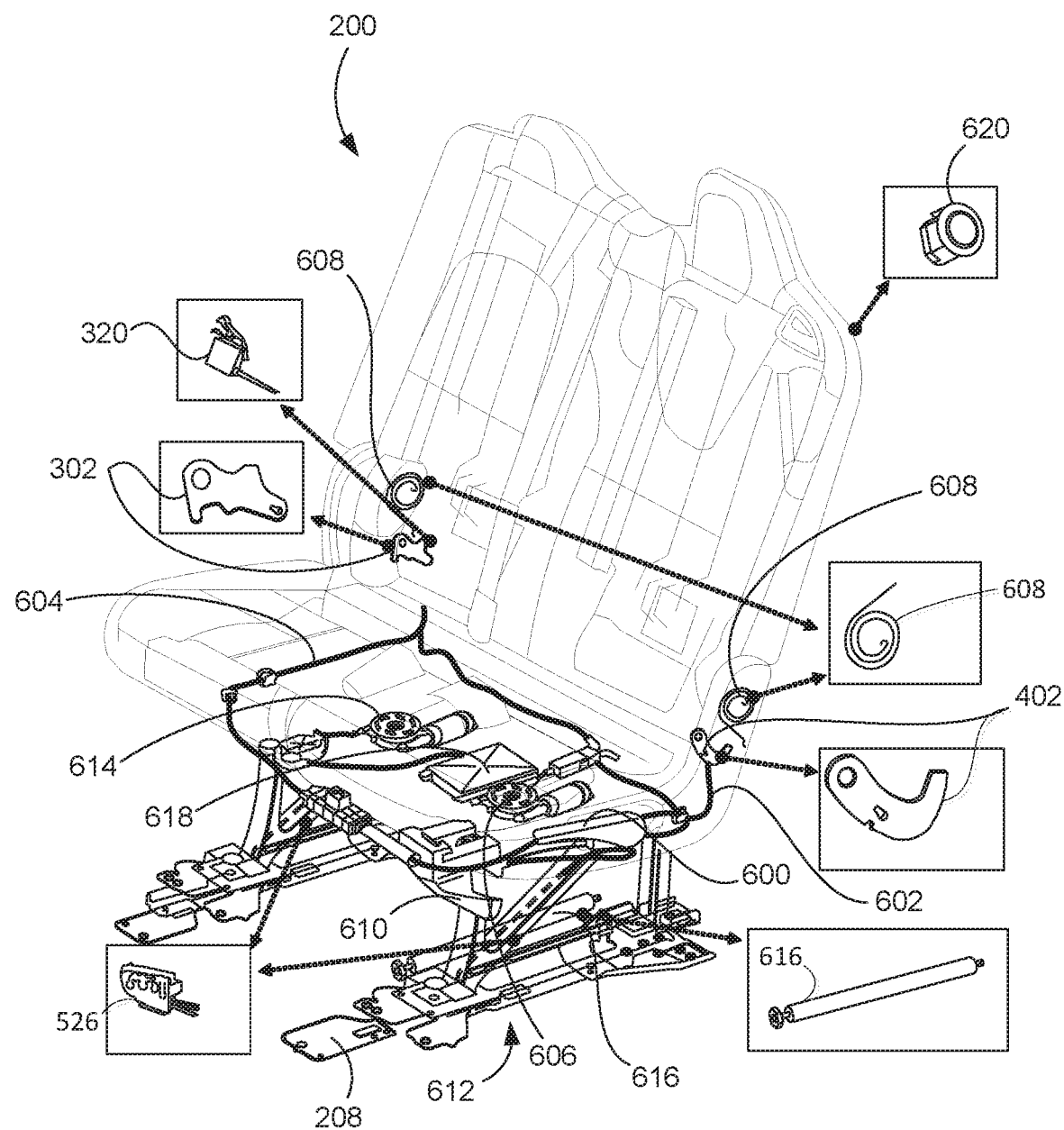
FIG. 6 shows an example of the vehicle seat from FIG. 2.

FIG. 6 shows an example of the vehicle seat 200 from FIG. 2. Some components are shown enlarged in respective insets for clarification. A release handle 600 is connected via a flexible cable 602 to the forward stopper 402 and via a flexible cable 604 to the rearward stopper 302. An actuator 606 (e.g., an electric motor) is configured for bi-directional actuation of the cables 602 and 604. A spring 608 can be provided for each of the recliners 202 and 204 (FIG. 2) to bias the seatback in a certain direction. For example, the spring(s) 608 can bias the seatback toward the seat cushion. That is, a user can actuate the release handle 600 to adjust the seatback between, say, any of the available comfort positions (e.g., more tilted, or less tilted). The seat system can also electronically actuate the release of the seatback by way of the actuator 606, and the seatback can then move according to the bias of the spring(s) 608.

A release handle 610 controls the comfort settings of a slider 612 on the track 208. The track 208 may have a detent region with one or more detents, and a tilt-and-slide region without detents. The release handle 610 can control the engagement between the slider 612 and one or more of the detents. For example, the release handle 610 can be coupled to the cable 524 (FIGS. 5A-C) so as to actuate the mechanism 514.

An actuator 614 (e.g., an electrical motor) can control the slider 612 for moving from the detent area into the tilt-and-slide area of the track 208. In some implementations, the actuator 614 is coupled to the cable 518 (FIGS. 5A-C). As such, the actuator 614 can cause the mechanism 514 to disengage from the detents 510, and can cause the mechanism 508 to disengage so as to allow the slider 612 to cross the boundary 516. The slider 612 can then be free to slide from the detent area into the tilt-and-slide area of the track 208. For example, a gas spring 616 can be mounted so as to bias the slider 612 in such a direction of travel, and thereby assist in the travel toward the tilt-and-slide region.

An electronic controller 618 can be positioned inside the seat or at a remote location (e.g., elsewhere in a vehicle). The electronic controller 618 can control one or more aspects of the seat system. In some implementations, the electronic controller 618 can be coupled to the actuator 606 and to the actuator 614. For example, this can allow the electronic controller 618 to bring the seat from a comfort mode (e.g., when the seatback is in a passenger position and the slider 612 is engaged with the detent(s)), to a tilt-and-slide mode (e.g., where the seatback is in a non-passenger position and the slider 612 is free to slide along the tilt-and-slide region of the track 208). In some implementations, the electronic controller 618 is an electronic control unit (ECU) configured to perform one or more kinematic operations with regard to one or more seats. For example, each seat in a vehicle can be associated with its respective ECU.

The vehicle seat 200 can have one or more switches or other sensors. When the vehicle seat 200 has two of the slider 612 (e.g., one of the slider 612 for each corresponding one of two parallel tracks 208), the vehicle seat 200 can have one of the switch 526 for each of the sliders 612. This can allow the electronic controller 618 to detect that the slider 612 is in a particular position (e.g., engaged with a detent). The vehicle seat 200 can have the switch 320 coupled to one of the recliners 202 and 204 (FIG. 2). Here, the switch 320 is associated with the rearward stopper 302. For example, this can allow the electronic controller 618 to detect that the seatback is in a passenger position.

The vehicle seat 200 can include one or more user controls. In some implementations, a switch 620 (e.g., a button) is positioned on the seat (e.g., on the top of the seatback) and is coupled to the electronic controller 618. For example, this can allow a user to trigger the electronic controller 618 to activate the actuator 606 and the actuator 614 to bring the vehicle seat 200 from a comfort mode into a tilt-and-slide mode.

The above examples illustrate that a seat system (e.g., including the vehicle seat 200) can include a base (e.g., the base 206), a seatback (e.g., the seatback of the vehicle seat 200), and at least one recliner (e.g., the recliner 300 and/or the recliner 400) connecting the base and the seatback to each other for pivoting of the seatback relative to the base. The seat system can include a slider (e.g., the slider 500) coupled to the base and configured for sliding engagement with a track (e.g., the track 502) having a detent region (e.g., the detent region 510') and a tilt-and-slide region (e.g., the tilt-and slide region 512). The seat system can include an electronic controller (e.g., the electronic controller 618). Particularly, without mechanical interlock between the recliner and the slider, the electronic controller can cause the recliner to place the seatback in a non-passenger position (e.g., as shown in state 104 (FIG. 1)) when the slider is within the tilt-and-slide region, and can cause the recliner to place the seatback in a passenger position (e.g., as shown in state 100 or 110 (FIG. 1)) when the slider is within the detent region.

The above examples illustrate that a seat system (e.g., including the vehicle seat 200) can include a first mechanism (e.g., the mechanism 508) actuated to allow the slider to bypass detents (e.g., the detent 510) in the detent region, and a second mechanism (e.g., the mechanism 514) actuated to allow the slider to cross a boundary (e.g., the boundary 516) between the detent region and the tilt-and-slide region.

The above examples illustrate that a seat system (e.g., including the vehicle seat 200) can include a switch (e.g., the switch 526) that the electronic controller uses in determining that the slider crosses the boundary between the detent region and the tilt-and-slide region.

The above examples illustrate that a seat system (e.g., including the vehicle seat 200) can include a recliner spring (e.g., the spring 608) coupled to the recliner, wherein placing the seatback in the non-passenger position comprises unlocking the recliner and allowing the recliner spring to pivot the seatback into the non-passenger position.

Figure 7:
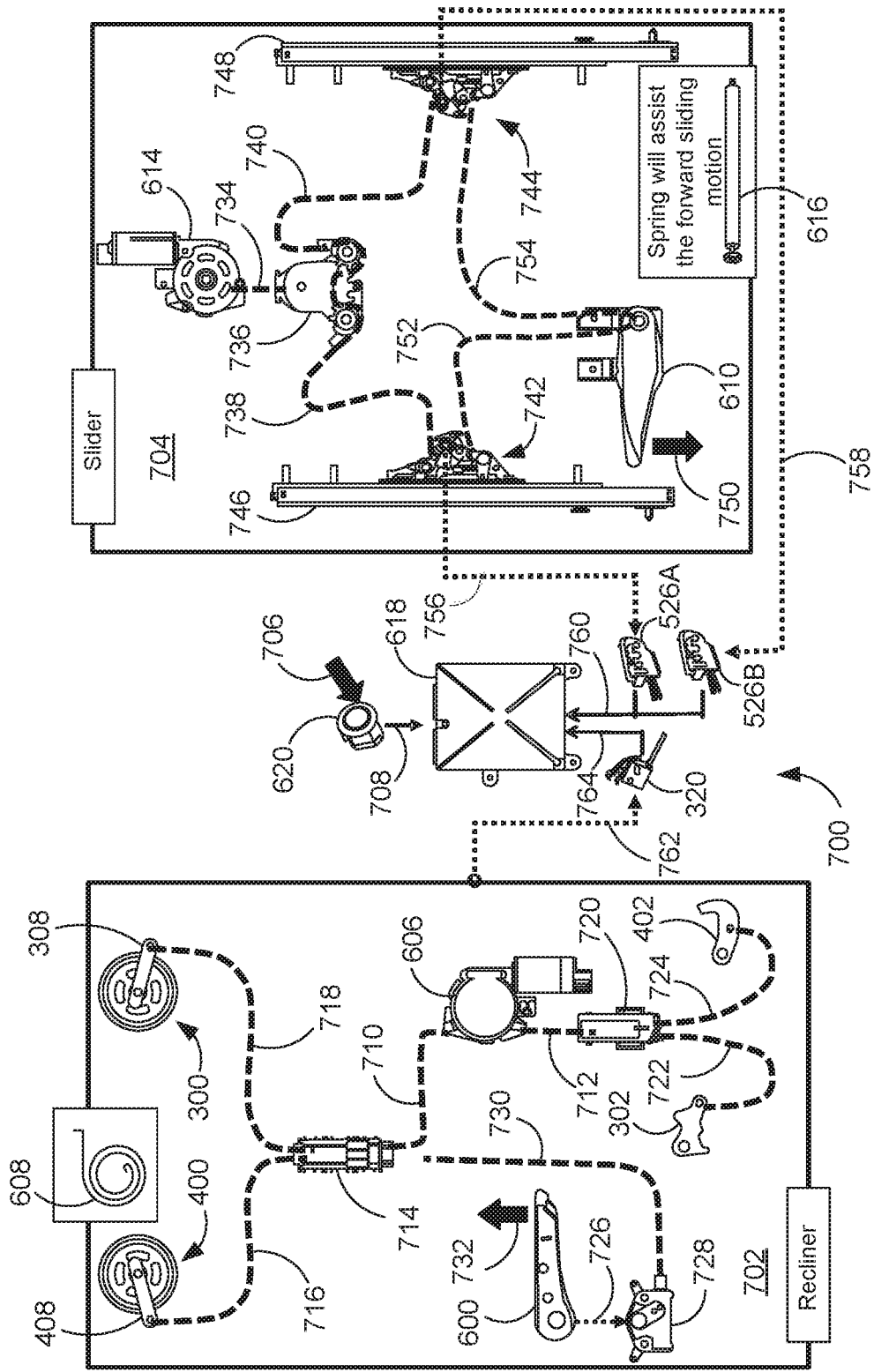
FIG. 7 shows a free body diagram of an example of a seat system.

FIG. 7 shows a free body diagram of an example of a seat system 700. The seat system 700 includes a recliner subsystem 702 and a slider subsystem 704. The seat system 700 includes the switch 620. For example, a user activated input schematically illustrated by an arrow 706 can generate an electrical signal (e.g., by the switch 620 engaging or disengaging) as schematically illustrated by an arrow 708, and can thereby trigger one or more operations by the electronic controller 618. User activated inputs in the seat system 700 are generally indicated using arrows of a similar style as the arrow 706. Electrical signals in the seat system 700 are generally indicated using arrows of a similar style as the arrow 708.

Upon receiving the electrical signal from the switch 620, the electronic controller 618 can energize the actuator 606 of the recliner subsystem 702, and can energize the actuator 614 of the slider subsystem 704. The actuator 606 can upon being energized begin pulling a cable 710 and similarly begin feeding out a cable 712. Cables in the seat system 700 are generally indicated using dashed lines of a similar style as those of the cables 710 and 712. The cables 710 and 712 can be separate cables or can be part of the same cable. The cable 710 is coupled to a 2-to-1 splitter 714. When the cable 710 is retracted, it causes the 2-to-1 splitter 714 to retract respective cables 716 and 718. The cable 716 is coupled to the lever 408 of the recliner 400. The cable 718 is coupled to the lever 308 of the recliner 300.

The lever 408 may normally be in a position where it locks the recliner 400 (e.g., by being biased into position by a spring). Similarly, the lever 308 may normally be in a position where it locks the recliner 300 (e.g., by being biased into position by a spring). By pulling the cables 716 and 718, the 2-to-1 splitter 714 can rotate the levers 308 and 408 and thereby unlock the respective recliners 300 and 400. This can allow the spring(s) 608 to assist in tilting the seatback (e.g., forward).

The cable 712 is coupled to a 2-to-1 splitter 720. When the cable 712 is fed out, it causes the 2-to-1 splitter 720 to feed out respective cables 722 and 724. The cable 722 is coupled to the rearward stopper 302 of the recliner 300. The cable 724 is coupled to the forward stopper 402 of the recliner 400. The rearward stopper 302 and the forward stopper 402 are here shown separate from the respective recliners 300 and 400 for clarity. The rearward stopper 302 may be biased toward engaging the recliner 300. Similarly, the forward stopper 402 may be biased toward engaging the recliner 400. By feeding out the cable 722, the 2-to-1 splitter 720 can facilitate that the rearward stopper 302 engages with the recliner 300, which can limit the seatback from tilting rearward (e.g., from the non-passenger position in state 104 of FIG. 1). By feeding out the cable 724, the 2-to-1 splitter 720 can facilitate that the forward stopper 402 engages with the recliner 400, which can limit the seatback from tilting further forward (e.g., from the non-passenger position in state 104 of FIG. 1). As such, the feeding out of the cables 722 and 724 can facilitate that the seatback is locked in a non-passenger position.

The recliner subsystem 702 also includes the release handle 600, which has a direct mechanical interface, as indicated by an arrow 726, to a cable pulley 728 and thereby to a cable 730. A user activated input on the release handle 600, as indicated by an arrow 732, can cause the cable 730 to be pulled, thereby causing the 2-to-1 splitter 714 to retract the cables 716 and 718. That is, the release handle 600 provides a way to control the recliners 300 and 400 so as to adjust the seatback without invoking the rearward stopper 302 and the forward stopper 402.

As mentioned, upon receiving the electrical signal from the switch 620, the electronic controller 618 can energize the actuator 614 of the slider subsystem 704. The actuator 614 can upon being energized begin pulling a cable 734. The cable 734 is coupled to a 2-to-1 splitter 736. When the cable 734 is retracted, it causes the 2-to-1 splitter 736 to retract respective cables 738 and 740. The cables 738 and 740 can be separate cables or can be part of the same cable. The cable 738 is coupled to a lever of a slider 742. The cable 740 is coupled to a lever of a slider 744. For example, each of the cables 738 and 740 can correspond to the cable 518 in FIGS. 5A-C. That is, retracting the cable 738 can cause the slider 742 to disengage one or more detents in a detent region of a track 746, and can allow the slider 742 to move from a detent region to a tilt-and-slide region of the track 746. Similarly, retracting the cable 740 can cause the slider 744 to disengage one or more detents in a detent region of a track 748, and to allow the slider 744 to move from a detent region to a tilt-and-slide region of the track 748. The slider subsystem 704 can include the gas spring 616 that pushes the sliders 742 and 744 from the detent regions into the tilt-and-slide regions of the respective tracks 746 and 748.

The slider subsystem 704 also includes the release handle 610, which by way of a user activated input as indicated by an arrow 750, can retract a cable 752 coupled to the slider 742, and a cable 754 coupled to the slider 744. For example, each of the cables 752 and 754 can correspond to the cable 524 in FIGS. 5A-C. That is, retracting the cable 752 can cause the slider 742 to disengage one or more detents in the detent region of the track 746 without allowing the slider 742 to move from the detent region to a tilt-and-slide region of the track 746. Similarly, retracting the cable 754 can cause the slider 744 to disengage one or more detents in a detent region of the track 748 without allowing the slider 744 to move from the detent region to the tilt-and-slide region of the track 748.

Thus, the user activated input schematically illustrated by the arrow 706 can trigger the electronic controller 618 to release the seatback of the recliner subsystem 702 into a non-passenger position, and to actuate the slider subsystem 704 into the tilt-and-slide region. For example, the seat system 700 can then assume the state 104 (FIG. 1).

A user can push the seat system in the opposite direction, for example as was described with reference to state 106 (FIG. 1). This causes the sliders 742 and 744 to slide relative to the respective tracks 746 and 748. When the slider 742 reaches the first detent of the track 746 and engages that detent, this can form a direct mechanical interface with a switch 526A, as indicated by an arrow 756. Similarly, when the slider 744 reaches the first detent of the track 748 and engages that detent, this can form a direct mechanical interface with a switch 526B, as indicated by an arrow 758. The switches 526A-B can generate one or more electrical signals, as indicated by an arrow 760, to the electronic controller 618. For example, this can signal to the electronic controller 618 that the seat has been secured and is not presently able to slide along the tracks 746 and 748.

The signal indicated by the arrow 760 can trigger the electronic controller 618 to release the seatback of the recliner subsystem 702 from its non-passenger position and allow it to assume a passenger position (e.g., as shown in state 108 (FIG. 1)). In some implementations, the actuator 606 can retract the cable 712, thereby causing the stoppers 302 and 402 to be disengaged, and can pay out the cable 710, thereby causing the levers 308 and 408 to lock the respective recliners 300 and 400. For example, the user pushes upward on the seatback until it reaches the passenger position. When the seatback reaches the passenger position, the recliner 300 or the recliner 400 makes a direct mechanical interface, as indicated by an arrow 762, with the switch 320. The switch 320 can generate one or more electrical signals, as indicated by an arrow 764, to the electronic controller 618. For example, this can signal to the electronic controller 618 that the seatback is in a passenger position (e.g., as shown in state 110 (FIG. 1)).

The above examples illustrate that the recliner subsystem 702 can have a direct mechanical interface with the switch 320 of the seat system, and that the slider subsystem 704 can have direct mechanical interfaces with the switches 526A-B. However, there is no direct mechanical interface between the recliner subsystem 702 and the slider subsystem 704.

The above examples illustrate that a seat system (e.g., the seat system 700) can include an actuator (e.g., the actuator 606) pulling a cable (e.g., the cable 716 and/or 718) of a lever (e.g., the lever 408 and/or 308) while paying out a cable (e.g., the cable 722 and/or 724) to forward and rearward stoppers (e.g., the stoppers 302 and 402).

The above examples illustrate that a seat system (e.g., the seat system 700) can include an actuator (e.g., the actuator 614) for a slider (e.g., the slider 742 and/or 744), the actuator configured to pull a cable (e.g., the cable 738 and/or 740) to actuate both first and second mechanisms (e.g., the mechanisms 508 and/or 514 in FIGS. 5A-C). The above examples illustrate that in a seat system (e.g., the seat system 700), actuating a lever on a second mechanism (e.g., the mechanism 508 in FIGS. 5A-C) can cause a lever on a first mechanism (e.g., the mechanism 514 in FIGS. 5A-C) to be actuated. The above examples illustrate that a seat system (e.g., the seat system 700) can include a manual handle (e.g., the release handle 610) coupled for actuating the first mechanism and not the second mechanism.

The above examples illustrate that a seat system (e.g., the seat system 700) can include a gas spring assist (e.g., the gas spring 616) coupled to the slider to assist the slider in traveling from the detent region to the tilt-and-slide region.

The above examples illustrate that a seat system (e.g., the seat system 700) can include a forward stopper (e.g., the forward stopper 402) and a rearward stopper (e.g., the rearward stopper 302) for the recliner.

The above examples illustrate that a seat system (e.g., the seat system 700) can include a button (e.g., the switch 620) coupled to the electronic controller. The button can trigger the electronic controller to bring the seat system from a comfort mode (e.g., the state 100 in FIG. 1) where the slider is within the detent region and the seatback is in the passenger position, to a tilt-and-slide mode (e.g., the state 104 in FIG. 1) where the slider is within the tilt-and-slide region and the seatback is within the non-passenger position.

The above examples illustrate that a seat system can be configured so that it quickly enters into an tilt-and-slide mode. This can be beneficial because a person need not wait as long before being able to pass by the seat. In some implementations, this time largely depends on the strength of the spring(s) 608 and the gas spring 616. As such, the kinematic action is not dependent on any actuator/motor to tilt the seatback or slide the seat base along the track.

Figure 8:
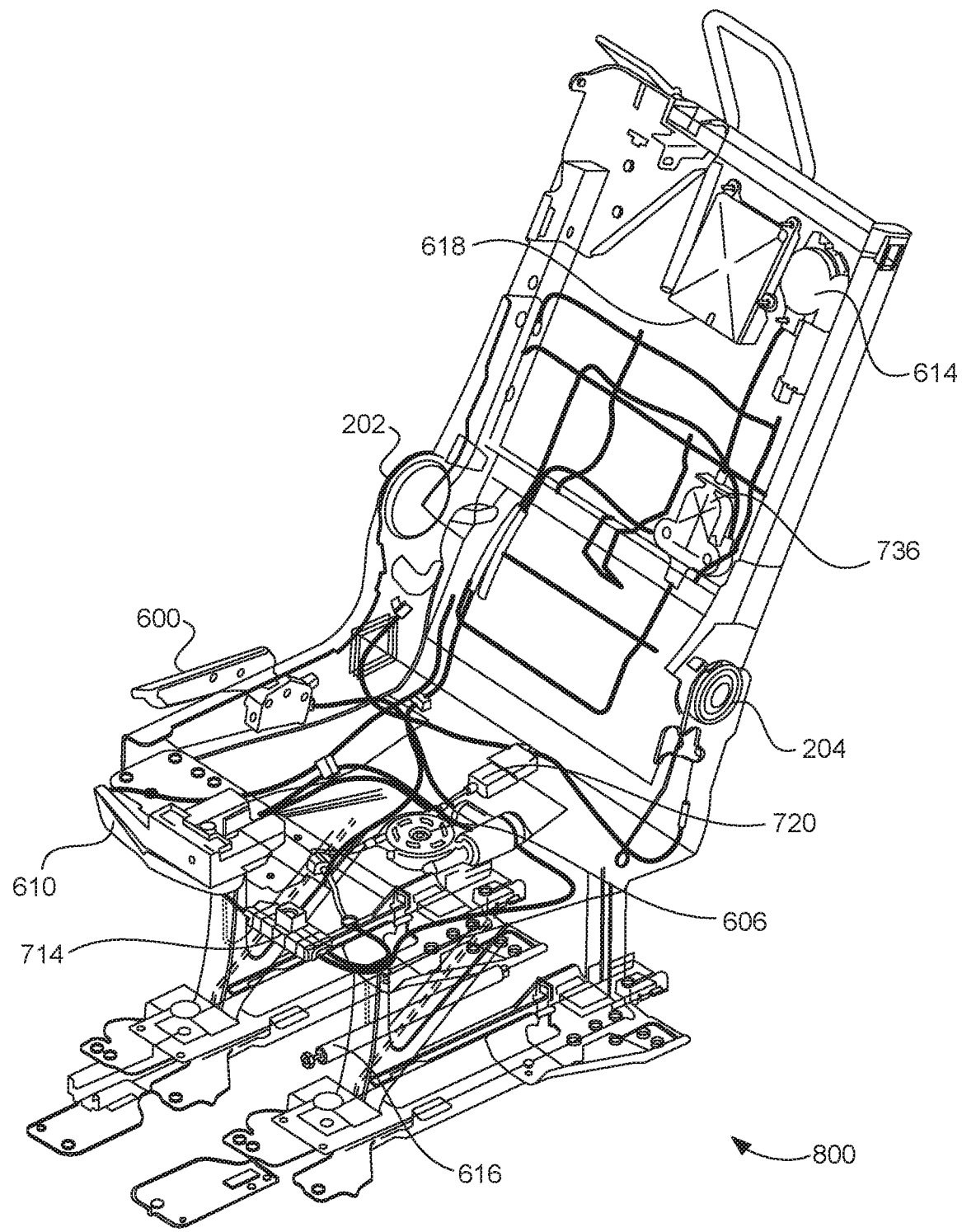
FIG. 8 shows an example of a layout for a seat system.

The above examples involve a multi-person seat (e.g., a two-person seat) for illustrative purposes. The present disclosure can also or instead be applied to a single-person seat. FIG. 8 shows an example of a layout for a seat system 800. In some implementations, the seat system 800 is configured for holding a single passenger and can include some or all of the components of the seat system 700. For example, the seat system 800 can include the actuator 614, electronic controller 618, 2-to-1 splitter 736, recliners 202 and 204, 2-to-1 splitter 720, actuator 606, release handle 600, release handle 610, 2-to-1 splitter 714, and the gas spring 616, arranged as shown.

Figure 9:
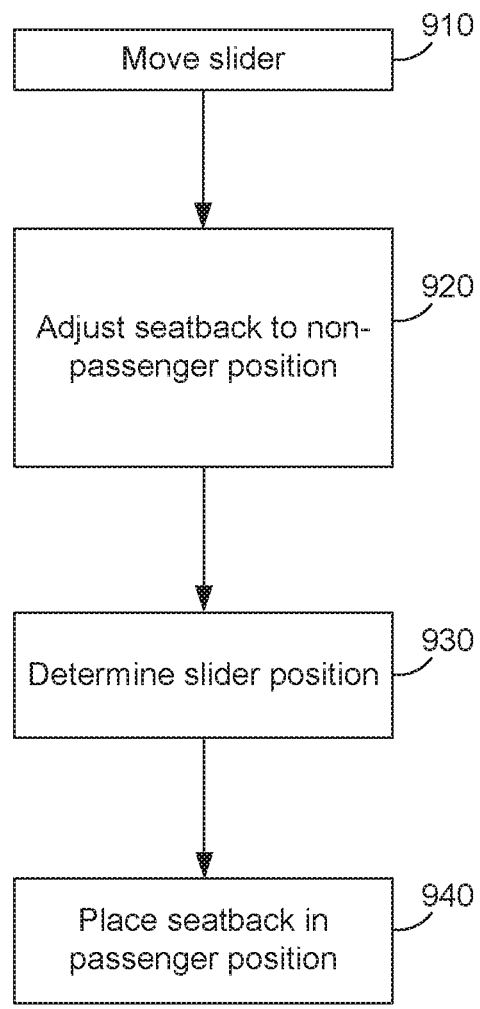
FIG. 9 shows a flowchart of an example method.

FIG. 9 shows a flowchart of an example method 900. The operations of the method 900 can be partially performed by an electronic controller. For example, such an electronic controller can include a processor that is executing instructions stored in a non-transitory medium (e.g., as part of an ECU). More or fewer operations than shown can be performed. Two or more operations can be performed in a different order.

At 910, a slider is moved. For example, the electronic controller 618 (FIG. 7) can trigger the slider subsystem 704 to release the sliders 742 and 744 so that the gas spring 616 can push the sliders 742 and 744 along the tracks 746 and 748. This action can be triggered by user input on the switch 620.

At 920, a seatback can be adjusted to a non-passenger position. This operation can at least partially overlap with 910. For example, the electronic controller 618 can trigger the recliner subsystem 702 to release the recliners 300 and 400 so that the spring(s) 608 can adjust the seatback toward a non-passenger position.

At 930, a slider position can be determined. For example, after the user pushes the seat toward the position it had before 910, the switch 526 can indicate that the slider has engaged with the detent(s).

At 940, the seatback can be placed in a passenger position. For example, once the slide position is determined at 930, the electronic controller 618 can disengage the stoppers 302 and 402 and allow the user to return the seatback to a passenger position.

Figure 10:
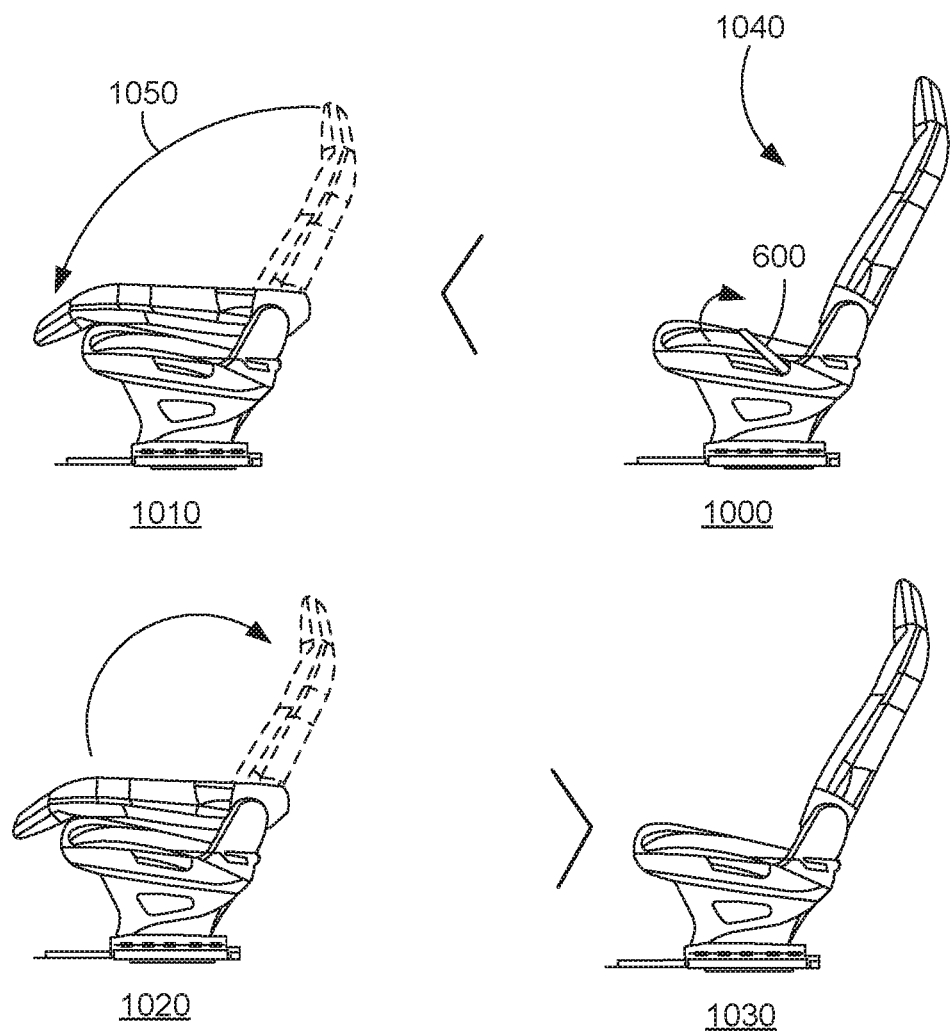
FIG. 10 shows examples of states in a fold-flat mode of a seat system.

FIG. 10 shows examples of states 1000-1030 in a fold-flat mode of a seat system 1040. The seat system can include any or all seat systems described herein. In the state 1000, a user pulls the release handle 600 that controls the seatback. Pulling the release handle 600 can release recliners without engaging any stoppers. The state 1010 shows that the seatback can tilt by an angle 1050. For example, the angle 1050 can be on the order of about 100-120 degrees. The state 1010 can correspond to a fold-flat mode. Because stoppers are not engaged, the seatback can be tilted (e.g., with assist by a recliner spring) as far as possible toward a seat cushion. The state 1020 indicates that the user raises the seatback from the fold-flat position. The state 1030 shows that the seat system 1040 again has the seatback in a passenger position. The above examples illustrates that seat system that is configured for performing certain kinematic behavior (e.g., the transition between a comfort mode and a tilt-and-slide mode as shown in FIG. 1) can also facilitate other kinematic behavior (e.g., the fold-flat mode shown in FIG. 10).

One or more modes can be invoked using a switch associated with a seat. In some implementations, the switch 620 (FIG. 6) can be used for triggering a tilt-and-slide mode (e.g., as shown in the state 104 of FIG. 1) and a fold-flat mode (e.g., as shown in the state 1010 of FIG. 10). The switch 620 can have one or more detents that allow the user to generate different inputs. For example, pushing only to the detent of the switch 620 (e.g., a light press) can trigger the tilt-and-slide mode. Pushing through the detent of the switch 620 (e.g., a heavy press) can trigger the fold-flat mode. The fold-flat mode can be at least partially automated by way of adding at least one actuator to the seat system. For example, an actuator can be added to the cable 730 (FIG. 7) to allow electronic release of the recliners 300 and 400 without invoking recliner stoppers.

Examples herein mention electronic controllers, such as ECUs. The ECU can be based on a processor executing instructions and can therefore be implemented using a combination of hardware, firmware and software. The ECU can be an embedded system that controls at least some aspects of a seat system. In a vehicle, for example, the ECU can be mounted inside (or on) the seat unit itself, or it can be connected to the seat unit from a remote location. The ECU includes one or more processors (e.g., as part of a microcontroller) and some form of memory (including, but not limited to, a static random access memory, an electrically erasable programmable read-only memory, and/or a solid-state non-volatile computer storage medium). The memory can include a non-transitory medium and have stored therein instructions that the processor can execute to perform one or more of the operations or functionalities described herein.

The ECU can be configured to receive one or more types of inputs. For example, and without limitation, a supply voltage, one or more digital inputs and/or one or more analog inputs can be provided to the ECU. The ECU can make one or more types of outputs. For example, and without limitation, the ECU can provide output in form of one or more drivers and/or at least one logic output.

When the ECU is part of a seat system for a vehicle seat, the ECU can communicate and act in coordination with one or more other components (e.g., elsewhere in the vehicle) by way of a network using at least one communication protocol. In some implementations, the vehicle has a controller area network (CAN), and the ECU then engages in CAN communications. For example, the ECU can manage restraint control features (e.g., an air bag and/or a seat belt pretensioner), seat safety features (e.g., a buckle sensor, seat position sensors, and/or an occupancy sensor), and/or seat features (e.g., seat movements).

The system and methods above has been described in general terms as an aid to understanding details of preferred embodiments of the present invention. In the description herein, numerous specific details are provided, such as examples of components and/or methods, to provide a thorough understanding of embodiments of the present invention. For example, in the application the term "processor" is used to not only refer to microprocessors, microcontrollers, and other similar organizations of electronic circuitry, but includes for purposes of this application an electronic circuit capable of executing instructions accessed from a memory. Data processing system is sometimes used herein to explicitly connote this broader context, but absent specific context to the contrary, uses of "processor" and similar are not limited to these particular arrangements of electronic circuitry. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention. A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A seat system comprising:
   a base;
   a seatback;
   at least one recliner connecting the base and the seatback to each other for pivoting of the seatback relative to the base;
   a slider coupled to the base and configured for sliding engagement with a track having a detent region and a tilt-and-slide region that are horizontally separate from one another, wherein the detent region of the track has detents, and wherein the tilt-and-slide region of the track does not have detents;
   a first mechanism and a second mechanism, wherein the first mechanism is actuated to allow the slider to bypass the detents in the detent region, wherein the second mechanism is actuated to allow the slider to cross a boundary between the detent region and the tilt-and-slide region, wherein the first mechanism and the second mechanism are both actuated by a first cable, and wherein the first mechanism is also actuated by a second cable without actuating the second mechanism;
   one or more switches or sensors configured to detect whether the slider is within the detent region; and
   an electronic controller, wherein without mechanical interlock between the at least one recliner and the slider and based at least on a detection by the one or more switches or sensors, the electronic controller causes the at least one recliner to place the seatback in a non-passenger position when the slider is within the tilt-and-slide region, and causes the at least one recliner to place the seatback in a passenger position when the slider is within the detent region.

2. The seat system of claim 1, further comprising a first actuator configured to actuate the first mechanism and the second mechanism.

3. The seat system of claim 2, wherein the first actuator is configured to pull the first cable to actuate the first mechanism and the second mechanism.

4. The seat system of claim 3, wherein, when the first actuator pulls the first cable, the first cable actuates a first lever on the second mechanism that causes a second lever on the first mechanism to be actuated.

5. The seat system of claim 2, further comprising a manual handle that actuates the second cable for actuating the first mechanism.

6. The seat system of claim 2, further comprising a gas spring assist coupled to the slider to assist the slider in traveling from the detent region to the tilt-and-slide region.

7. The seat system of claim 1, further comprising a forward stopper and a rearward stopper for the at least one recliner.

8. The seat system of claim 7, further comprising a lever on the at least one recliner, and an actuator, the actuator actuating the forward stopper, the rearward stopper, and the lever.

9. The seat system of claim 8, wherein the actuator actuates the forward stopper, the rearward stopper, and the lever by pulling a third cable of the lever while paying out the third cable to the forward stopper and the rearward stopper.

10. The seat system of claim 7, wherein the at least one recliner includes a first recliner and a second recliner, wherein the forward stopper acts on the first recliner, and wherein the rearward stopper acts on the second recliner.

11. The seat system of claim 1, wherein the one or more switches or sensors include a switch that the electronic controller uses in determining that the slider crosses the boundary between the detent region and the tilt-and-slide region.

12. The seat system of claim 1, further comprising a recliner spring coupled to the at least one recliner, wherein placing the seatback in the non-passenger position comprises unlocking the at least one recliner and allowing the recliner spring to pivot the seatback into the non-passenger position.

13. The seat system of claim 1, further comprising a recliner switch, wherein the electronic controller uses the recliner switch to determine that the seatback is in the passenger position.

14. The seat system of claim 1, further comprising a button coupled to the electronic controller, the button to trigger the electronic controller to bring the seat system from a comfort mode where the slider is within the detent region and the seatback is in the passenger position, to a tilt-and-slide mode where the slider is within the tilt-and-slide region and the seatback is within the non-passenger position.

15. A method comprising:
receiving a user activated input, the user activated input generated via a switch or a button in electrical connection with an electronic controller configured to energize one or more actuators associated with a seat system;
moving, based on activation of the electronic controller, a slider of the seat system from a detent region of a track to a tilt-and-slide region of the track by actuating a first cable to actuate a first mechanism and a second mechanism, wherein the detent region and the tilt-and-slide region are horizontally separated from one another, wherein the detent region has detents, and wherein the tilt-and-slide region does not have detents, wherein the first mechanism is actuated to allow the slider to bypass the detents in the detent region, wherein the second mechanism is actuated to allow the slider to cross a boundary between the detent region and the tilt-and-slide region, wherein the first mechanism and the second mechanism are both actuated by the first cable, and wherein the first mechanism is also actuated by a second cable without actuating the second mechanism;
adjusting, based on the activation of the electronic controller, a seatback to a non-passenger position while the slider is in the tilt-and-slide region, the seatback adjusted using a recliner that has no mechanical interlock with the slider;
determining, based on the activation of the electronic controller, that the slider has moved from the tilt-and-slide region to the detent region; and
in response to determining that the slider is in the detent region, placing, based on the activation of the electronic controller, the seatback in a passenger position using the recliner.

16. The method of claim 15, wherein the first mechanism and the second mechanism are actuated by a first actuator.

17. The method of claim 16, wherein actuating the first mechanism and the second mechanism comprises the first actuator pulling the first cable.

18. The method of claim 17, wherein actuating the first mechanism and the second mechanism further comprises, when the first actuator pulls the first cable, actuating a first lever on the second mechanism that causes a second lever on the first mechanism to be actuated.

19. The method of claim 15, further comprising applying gas spring assist in moving the slider from the detent region to the tilt-and-slide region.

20. The method of claim 15, wherein adjusting the seatback to the non-passenger position comprises releasing the recliner and applying forward and rearward stoppers to the recliner.

21. The method of claim 20, wherein releasing the recliner comprises pulling a third cable of the recliner, and wherein applying the forward and rearward stoppers to the recliner comprises feeding out the third cable to the forward and rearward stoppers.

22. The method of claim 15, wherein adjusting the seatback to the non-passenger position while the slider is in the tilt-and-slide region comprises placing the seat system in a tilt-and-slide mode in response to a first input, and wherein placing the seatback in the passenger position in response to the slider having moved from the tilt-and-slide region to the detent region comprises placing the seat system in a comfort mode, the method further comprising receiving a second input to place the seat system in a fold flat mode, and in response to the second input, releasing the recliner without applying any stopper to the recliner, and allowing a recliner spring to pivot the seatback into a fold flat position.

* * * * *